United States Patent
Joglekar et al.

(10) Patent No.: US 11,443,202 B2
(45) Date of Patent: Sep. 13, 2022

(54) REAL-TIME ON THE FLY GENERATION OF FEATURE-BASED LABEL EMBEDDINGS VIA MACHINE LEARNING

(71) Applicant: Google LLC, Mountain View, CA (US)

(72) Inventors: Manas Rajendra Joglekar, Mountain View, CA (US); Jay Adams, San Carlos, CA (US); Sujeet Bansal, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 578 days.

(21) Appl. No.: 16/551,829

(22) Filed: Aug. 27, 2019

(65) Prior Publication Data

US 2021/0004693 A1   Jan. 7, 2021

Related U.S. Application Data

(60) Provisional application No. 62/870,489, filed on Jul. 3, 2019.

(51) Int. Cl.
  *G06N 20/00*   (2019.01)
  *G06N 5/04*   (2006.01)
  *G06F 16/955*   (2019.01)
  *G06N 3/08*   (2006.01)

(52) U.S. Cl.
  CPC ............ *G06N 5/04* (2013.01); *G06F 16/955* (2019.01); *G06N 3/084* (2013.01); *G06N 20/00* (2019.01)

(58) Field of Classification Search
  CPC .. G06F 16/955; G06F 16/24578; G06F 16/93; G06F 16/953; G06N 3/084; G06N 5/04; G06N 20/00; G06Q 30/0255
  See application file for complete search history.

(56) References Cited

U.S. PATENT DOCUMENTS

| | | | |
|---|---|---|---|
| 9,882,999 B1* | 1/2018 | Xu | G06N 20/00 |
| 11,062,228 B2* | 7/2021 | Kim | G06N 20/00 |
| 2016/0300252 A1* | 10/2016 | Frank | G06F 16/24578 |
| 2018/0285459 A1* | 10/2018 | Soni | G06F 16/93 |
| 2019/0007508 A1* | 1/2019 | Xu | G06Q 30/0255 |
| 2019/0197396 A1* | 6/2019 | Rajkumar | B25J 9/0003 |

(Continued)

OTHER PUBLICATIONS

Covington et al., "Deep Neural Networks for YouTube Recommendations", Conference on Recommender Systems, Sep. 15-19, 2016, Boston, Massachusetts, 8 pages.

(Continued)

*Primary Examiner* — Le H Luu
(74) *Attorney, Agent, or Firm* — Dority & Manning, P.A.

(57) ABSTRACT

The present disclosure is directed to systems and methods that include a machine-learned label embedding model that generates feature-based label embeddings for labels in real-time, in furtherance, for example, of selection of labels relative to a particular entity. In particular, one example computing system includes both a machine-learned entity embedding model configured to receive and process entity feature data descriptive of an entity to generate an entity embedding for the entity and a machine-learned label embedding model configured to receive and process first label feature data associated with a first label to generate a first label embedding for the first label.

20 Claims, 7 Drawing Sheets

(56) References Cited

U.S. PATENT DOCUMENTS

2020/0089684 A1* 3/2020 Gotmanov ............ G06F 16/953

OTHER PUBLICATIONS

Grbovic et al., "Real-Time Personalization using Embeddings for Search Rankings at Airbnb", International Conference on Knowledge Discovery & Data Mining, Aug. 19-23, 2018, London, United Kingdom, 10 pages.

Wang et al., "DKN: Deep Knowledge-Aware Network for News Recommendation", arXiv: 1801v2, Jan. 30, 2018, 10 pages.

* cited by examiner

REAL-TIME ON THE FLY GENERATION OF FEATURE-BASED LABEL EMBEDDINGS VIA MACHINE LEARNING

FIELD

The present disclosure relates generally to the use of machine learning techniques for label selection. More particularly, the present disclosure relates to systems and methods that include a machine-learned label embedding model that generates feature-based label embeddings for labels in real-time, in furtherance, for example, of selection of labels relative to a particular entity.

BACKGROUND

There are many different scenarios in which it may be useful or beneficial to select one or more of a number of different labels for or relative to a particular entity. As examples, the different labels can correspond to potential actions that the entity can perform next, potential states that the entity can enter or experience, and/or potential items that the entity would enjoy viewing, receiving, or otherwise interacting with next. Thus, in some examples, predicting an entity's next action based on the entity's past actions is an integral problem for selecting items of content, search queries, and/or the like to recommend an entity.

SUMMARY

Aspects and advantages of embodiments of the present disclosure will be set forth in part in the following description, or can be learned from the description, or can be learned through practice of the embodiments.

One example aspect of the present disclosure is directed to a computing system to select labels for an entity. The computing system includes one or more processors and one or more non-transitory computer-readable media that collectively store a machine-learned entity embedding model configured to receive and process entity feature data descriptive of an entity to generate an entity embedding for the entity. The one or more non-transitory computer-readable media collectively store a machine-learned label embedding model configured to receive and process first label feature data associated with a first label to generate a first label embedding for the first label. The one or more non-transitory computer-readable media collectively store instructions that, when executed by the one or more processors, cause the computing system to perform operations. The operations include determining a score for the first label based at least in part on a comparison of the entity embedding and the first label embedding. The operations include determining whether to select the first label for the entity based at least in part on the score determined for the first label.

Another example aspect of the present disclosure is directed to a computer-implemented method to train a machine-learned label embedding model in a label selection system. The method includes obtaining, by one or more computing devices, a plurality of training examples, the plurality of training examples comprising a positive label example associated with an entity and a negative label example unassociated with the entity. The method includes respectively inputting, by the one or more computing devices, each of the plurality of training examples into the machine-learned label embedding model that is configured to process the plurality of training examples to respectively generate a plurality of label embeddings. The method includes receiving, by the one or more computing devices, the plurality of label embeddings as an output of the machine-learned label embedding model. The method includes generating, by the one or more computing devices, a plurality of label scores by respectively comparing the plurality of label embeddings with an entity embedding associated with the entity, the plurality of label scores comprising a positive score for the positive label example and a negative score for the negative label example. The method includes modifying, by the one or more computing devices, one or more parameters of the machine-learned label embedding model based at least in part on a loss function that provides a loss value based at least in part on the plurality of label scores, wherein the loss value is positively correlated with the negative score and negatively correlated with the positive score.

Another example aspect of the present disclosure is directed to one or more non-transitory computer-readable media that collectively store instructions that, when executed by one or more computing devices, cause the one or more computing devices to perform operations. The operations include receiving an entity request that identifies an entity. The operations include accessing a machine-learned label embedding model that is personalized for and associated with the entity. The operations include identifying a plurality of potential labels for the entity. The operations include accessing a plurality of sets of label feature data respectively associated with the plurality of potential labels. The operations include respectively inputting each of the plurality of sets of label feature data into the machine-learned label embedding model that is configured to process the sets of label feature data to respectively generate a plurality of label embeddings. The operations include receiving the plurality of label embeddings as an output of the machine-learned label embedding model. The operations include generating a plurality of label scores by respectively comparing the plurality of label embeddings with an entity embedding associated with the entity. The operations include selecting one or more of the potential labels to recommend to the entity based at least in part on the plurality of label scores.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
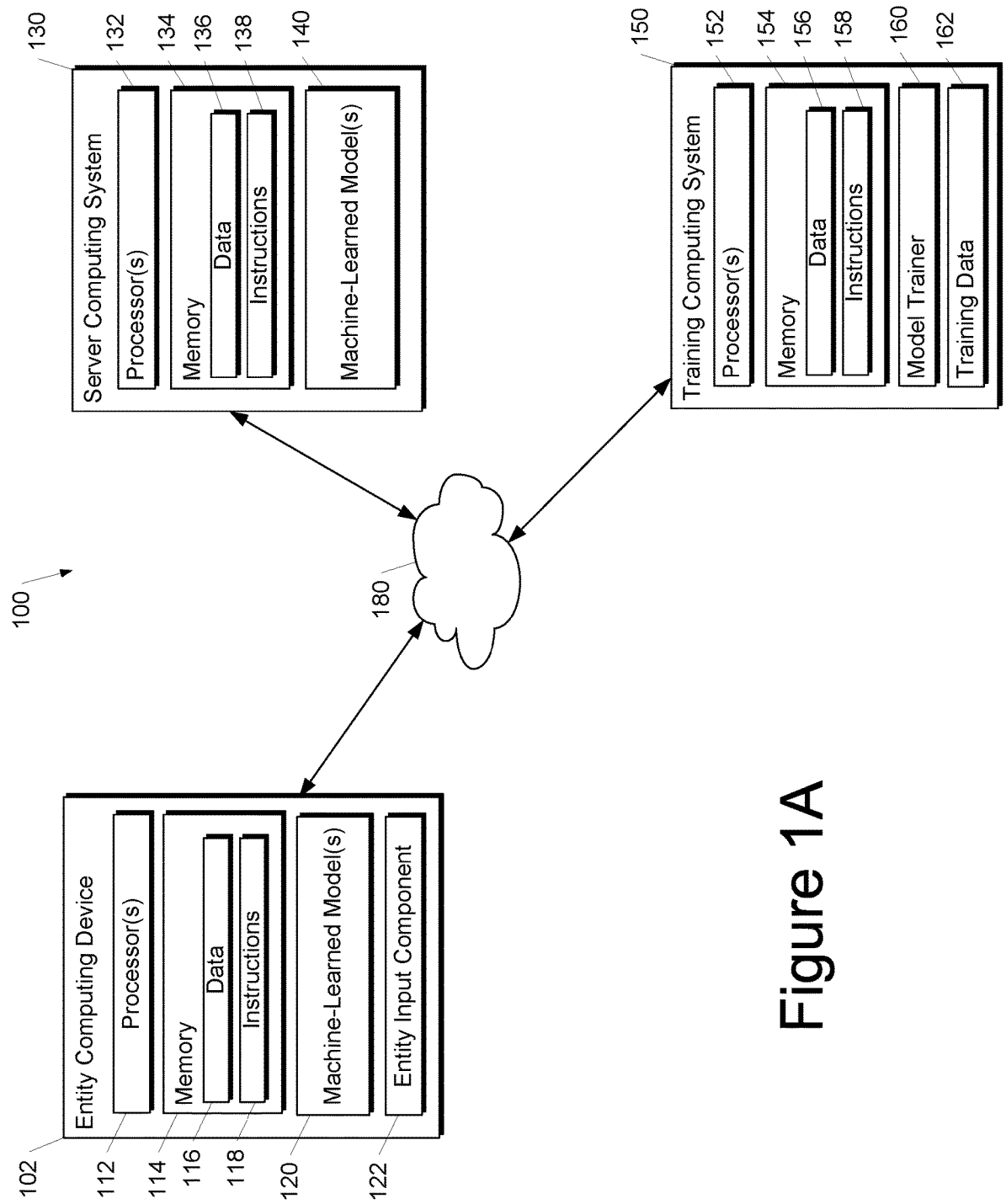
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to systems and methods that include a machine-learned label embedding model that generates feature-based label embeddings for labels in real-time, in furtherance, for example, of selection of labels relative to a particular entity. In particular, one example computing system includes both a machine-learned entity embedding model configured to receive and process entity feature data descriptive of an entity to generate an entity embedding for the entity and a machine-learned label embedding model configured to receive and process first label feature data associated with a first label to generate a first label embedding for the first label. According to an aspect of the present disclosure, the computing system can run or otherwise execute or implement the machine-learned label embedding model to produce the label embedding subsequent to and/or in response to receiving a request associated with the entity (e.g., a request to select a label for the entity). The machine-learned label embedding model and the machine-learned entity embedding model can be stored on one or more memories of a computing system. Thus, the label embedding(s) can be produced on the fly during the label selection process and, therefore, do not need to be stored ahead of time and/or constantly re-determined. Accordingly, various implementations described herein are motivated by technical considerations relating to internal memory management within the computing system when the recommendation system is implemented. This is particularly relevant for implementations in resource-constrained environments, such as environments where the one or more memories on which the machine-learned embedding model is stored comprise on-device memories of an entity device. Once the label and entity embeddings have been produced, the computing system can determine a score for the first label based at least in part on a comparison of the entity embedding and the first label embedding. For example, the comparison can include determining a dot product between the entity embedding and the first label embedding. The computing system can determine whether to select the first label for the entity based at least in part on the score determined for the first label.

In one example, the label(s) can be items of content. For example, models can be trained to predict an entity's next visited video or song. These models may be used to provide video or song recommendations while the entity is browsing a video or song sharing website. As another example, the label(s) can be potential search queries and models can be used to predict a next query of the entity. Predictions of the entity's next query can be used to perform automatic completion of a search query or other query suggestions. As yet another example, the label(s) can be uniform resource locator(s) (URLs) such that the computing system can be applied to recommend, on the fly, one or more URLs from a large or fast-changing set of URLs. In particular, predictions of a next website (e.g., which may be represented in the form of a URL) can be used to power and/or improve features such as selection of search results (e.g., for inclusion in a search results webpage), items of content (e.g., for inclusion in a feed such as a news feed or social feed), and/or many other similar problems/use cases.

More particularly, one possible alternative system predicting labels for an entity employs an entity embedding neural network and a set of directly learned label embeddings. In particular, the entity embedding neural network (e.g., which can be referred to as an entity tower) can be configured to process an entity's history to produce an entity embedding (e.g., a numerical vector). Each label embedding can include a vector representing a corresponding one of the possible labels (e.g. each possible URL, query, video, location, state (e.g., sensor state), or other item). The dot product of the entity embedding with the embedding of any specific label can provide the score of that label. For example, the score can indicate how likely the entity is to visit that label or otherwise desire or enjoy interacting with or receiving that label.

In contrast to the systems described herein, however, the label embeddings in such an alternative system are directly and simultaneously learned. That is, when the entity model (e.g., neural network) is trained, it is trained so that it will give higher scores to the label that was visited by, clicked on, or otherwise associated with the entity, and lower scores to other labels. An entity can include a user, a group of users, an organization, a point of interest, a location, an account, a label, an item of content, a sensor, an agent (e.g., a reinforcement learning agent), and/or other items.

As part of this process, the label embeddings are themselves learned/optimized (e.g., treated as the parameters to be learned). This approach does not scale well to very large numbers (e.g., 100s of millions) of labels, because of the need to store and learn a separate embedding for each label value. Thus, this alternative approach is problematic for URL prediction, as the number of URLs to predict from can be very high. Another problem associated with this alternative approach arises when additional labels (e.g., new fresh URLs such as news articles and blog posts) come into existence. For example, an entity neural network model trained last week to predict relative a set of URLs that existed last week may no longer be useful today, as it does not make recommendations using all new articles from this week. Accommodating new labels therefore requires re-learning all of the label embeddings, as each label embedding is jointly learned/optimized together with all of the other label embeddings. Re-learning all of the embeddings for 100s of millions of labels in a very large computational task that requires significant expenditure of computational resources such as processor usage, memory usage, network bandwidth, and the like. Similarly, for the same reasons described above, the creation of personalized label embeddings for each entity is challenging and computationally costly to perform.

Aspects of the present disclosure resolve the problem of selecting (e.g., for recommendation) one or more labels from a large or fast-changing set of potential labels (e.g., URLs, content items such as videos or songs, search query auto-completions, and/or the like). Specifically, instead of directly learning each embedding per item, example implementations can instead learn an additional machine-learned label embedding model (which may be an artificial neural network (hereinafter "neural network") and/or which can be referred to as a label embedding tower). This machine-learned label embedding model can generate one or more label embeddings for potential labels on the fly (e.g., in response to and during an attempt to select labels for an entity) using various features of the label. By producing the label embedding on the fly, a large number of label embeddings do not need to be routinely updated, stored, and then later accessed. Instead, label embeddings can simply be created on an "as-needed" basis. This can result in conservation of computing resources such as processor usage, memory usage, network bandwidth, and the like.

More particularly, in some implementations, a computing system can maintain, include and/or have access to a Sorted-String Table (also known as an "SSTable") that maps each label from a vocabulary to a set of label features associated with such label. In some implementations, the vocabulary of potential labels can have a significantly large size such as, for example, 250 million in the case of URLs. The label features for each label can be any different characteristics, attributes, qualities, or other information that describes or is associated with such label. As one example, for a URL, the label features can include the words in the URL, the title of the URL, and/or salient terms included in the content accessible at the URL. As another example, for a video, the label features can include video creator and/or host identity, content classification, file type, resolution, color schemes, etc.

Thus, a table or other database structure (e.g., an SSTable) can store a set of label features for each of a number of different potential labels. An SSTable can include or store a sorted list of <key,value> string pairs. In some implementations, keys do not have to be unique and any string or protocol buffer can be used for both keys and values.

To train the label embedding model, the computing system can create a training example batch that includes a plurality of training examples. As one example, each training example can be derived from a data pair that identifies a past label that was selected, clicked on, liked, purchased, or otherwise previously interacted with by the entity (e.g., (entity_history, clicked_URL)). These training examples derived from the entity's past positive interactions may be referred to as positive label training examples. If training examples are taken only from a single entity's history, the resulting models can be personalized to such entity and therefore provide improved selection of labels for that entity. However, in other instances, generalized models can be used that learn from training examples taken from multiple different entities.

According to another aspect of the present disclosure, in some implementations, in addition to positive label training examples, the computing system can sample some number of other labels at random, to act as negative training examples. As one example, the negative training examples can correspond to labels that the entity did not select, click, like purchase or otherwise previously interact with. For example, the negative training examples can correspond to labels that, despite being presented with the opportunity to do so, the entity did not select, click, like purchase or otherwise previously interact with.

Thus, in some implementations, in contrast with certain alternative systems, the systems and methods of the present disclosure can use randomly sampled negatives that are completely unassociated with the entity (e.g., the negatives are simply random selections of other labels, regardless of whether the entity declined an opportunity to interact with such label). In such fashion, the systems and methods of the present disclosure can have access to a much larger number of negative samples to use in the training of the model(s). For example, certain alternative approaches are restricted the set of negatives that are included the training batch (e.g., the entity declined or dismissed the opportunity to interact with the label). These confirmed negatives are a smaller number (e.g., <5 k). When any label can be randomly used as a negative, the number of negatives training examples used during training can be much larger (e.g., 50 k), which experiments have shown leads to large gains in accuracy of the model.

In some implementations, once the relevant training examples have been identified for inclusion in the batch of training data, the computing system can query the SSTable service to fetch the features of each positive and negative label included in the training batch to create a full training batch. These batches can be placed in a queue that acts as a buffer (e.g., since SSTable services can have high latency but also high throughput). Another thread implemented by the computing system can take these batches out of the queue, run the label embedding model on the label features to generate label embeddings on the fly, and train both the entity embedding model and the label embedding model using a loss function. As one example, the loss function can provide a loss value that is positively correlated with scores given to the negative training examples and negatively correlated with scores given to the positive training examples. In such fashion, minimization of the loss value can push/train the embedding models to produce respective embeddings that provide relatively large scores for the positive examples (e.g., past clicked URLs) and relatively smaller scores for the negative examples (e.g., unclicked URLs).

One the model(s) have been trained, they can be deployed to perform real-time on the fly label selection for the entity. For example, the computing system can await receipt of a request associated with the entity (e.g., a request to select a label for the entity). Subsequent to and/or in response to receiving the request associated with the entity, the computing system can employ the machine-learned label embedding model to produce one or more label embedding(s) for one or more potential labels on the fly during the label selection process. Therefore, large numbers of label embeddings do not need to be stored ahead of time and/or constantly re-computed.

In some implementations, all training and/or deployment of the entity embedding model and/or the label embedding model can be performed "on-device" or otherwise limited to a computing system owned and/or trusted by the entity. In such fashion, entity feature data can be retained and used only on the entity's computing system, thereby improving the entity's privacy. Furthermore, an entity may be provided with controls allowing the entity to make an election as to both if and when systems, programs, or features described herein may enable collection of entity information.

With reference now to the Figures, example embodiments of the present disclosure will be discussed in further detail.

Example Devices and Systems

FIG. 1A depicts a block diagram of an example computing system 100 according to example embodiments of the present disclosure. The system 100 includes an entity computing device 102, a server computing system 130, and a training computing system 150 that are communicatively coupled over a network 180.

The entity computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The entity computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the entity computing device 102 to perform operations.

In some implementations, the entity computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 2 and 3.

In some implementations, the one or more machine-learned models 120 can be received from the server computing system 130 over network 180, stored in the entity computing device memory 114, and then used or otherwise implemented by the one or more processors 112. In some implementations, the entity computing device 102 can implement multiple parallel instances of a single machine-learned model 120 (e.g., to perform parallel label selection across multiple instances).

Additionally or alternatively, one or more machine-learned models 140 can be included in or otherwise stored and implemented by the server computing system 130 that communicates with the entity computing device 102 according to a client-server relationship. For example, the machine-learned models 140 can be implemented by the server computing system 140 as a portion of a web service (e.g., a label selection service). Thus, one or more models 120 can be stored and implemented at the entity computing device 102 and/or one or more models 140 can be stored and implemented at the server computing system 130.

The entity computing device 102 can also include one or more entity input component 122 that receives entity input. For example, the entity input component 122 can be a touch-sensitive component (e.g., a touch-sensitive display screen or a touch pad) that is sensitive to the touch of an entity input object (e.g., a finger or a stylus). The touch-sensitive component can serve to implement a virtual keyboard. Other example entity input components include a microphone, a traditional keyboard, or other means by which an entity can provide entity input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the data 136 can include entity history data that provides a history of entity interactions (or lack of interaction) with various labels. Other entity data can be stored as well such as location, attributes, characteristics, etc. In some implementations, the data 136 can include a table (e.g., an SSTable) that stores sets of label feature data respectively associated with labels. An entity may be provided with controls allowing the entity to make an election as to both if and when systems, programs, or features described herein may enable collection of entity information (e.g., information about an entity's social network, social actions, or activities, profession, an entity's preferences, or an entity's current location), and if the entity is sent content or communications from a server. In addition, certain data may be treated in one or more ways before it is stored or used, so that personally identifiable information is removed. For example, an entity's identity may be treated so that no personally identifiable information can be determined for the entity, or an entity's geographic location may be generalized where location information is obtained (such as to a city, ZIP code, or state level), so that a particular location of an entity cannot be determined. Thus, the entity may have control over what information is collected about the entity, how that information is used, and what information is provided to the entity.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 and 3.

The entity computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the entity computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. Various loss functions can be used such as mean squared error, likelihood loss, cross entropy loss, hinge loss, and/or various other loss functions. The model trainer 160 can perform, for example, the process shown in FIG. 2 and/or method 400 of FIG. 4.

In particular, the model trainer 160 can train the machine-learned models 120 and/or 140 based on a set of training data 162. The training data 162 can include, for example, a plurality of training examples. The plurality of training examples can include a plurality of positive label examples associated with an entity (e.g., past labels that the entity interacted with) and a plurality of negative label examples unassociated with the entity. Some or all of the negative label examples can be randomly selected from a set of labels (e.g., regardless of whether the entity disregarded or dismissed such label in the past).

In some implementations, if the entity has provided consent, the training examples can be provided by the entity computing device 102. Thus, in such implementations, the model 120 provided to the entity computing device 102 can be trained by the training computing system 150 on entity-specific data received from the entity computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the entity computing device 102 can include the model trainer 160 and the training dataset 162.

In such implementations, the models 120 can be both trained and used locally at the entity computing device 102. In some of such implementations, the entity computing device 102 can implement the model trainer 160 to personalize the models 120 based on entity-specific data.

Figure 1B:
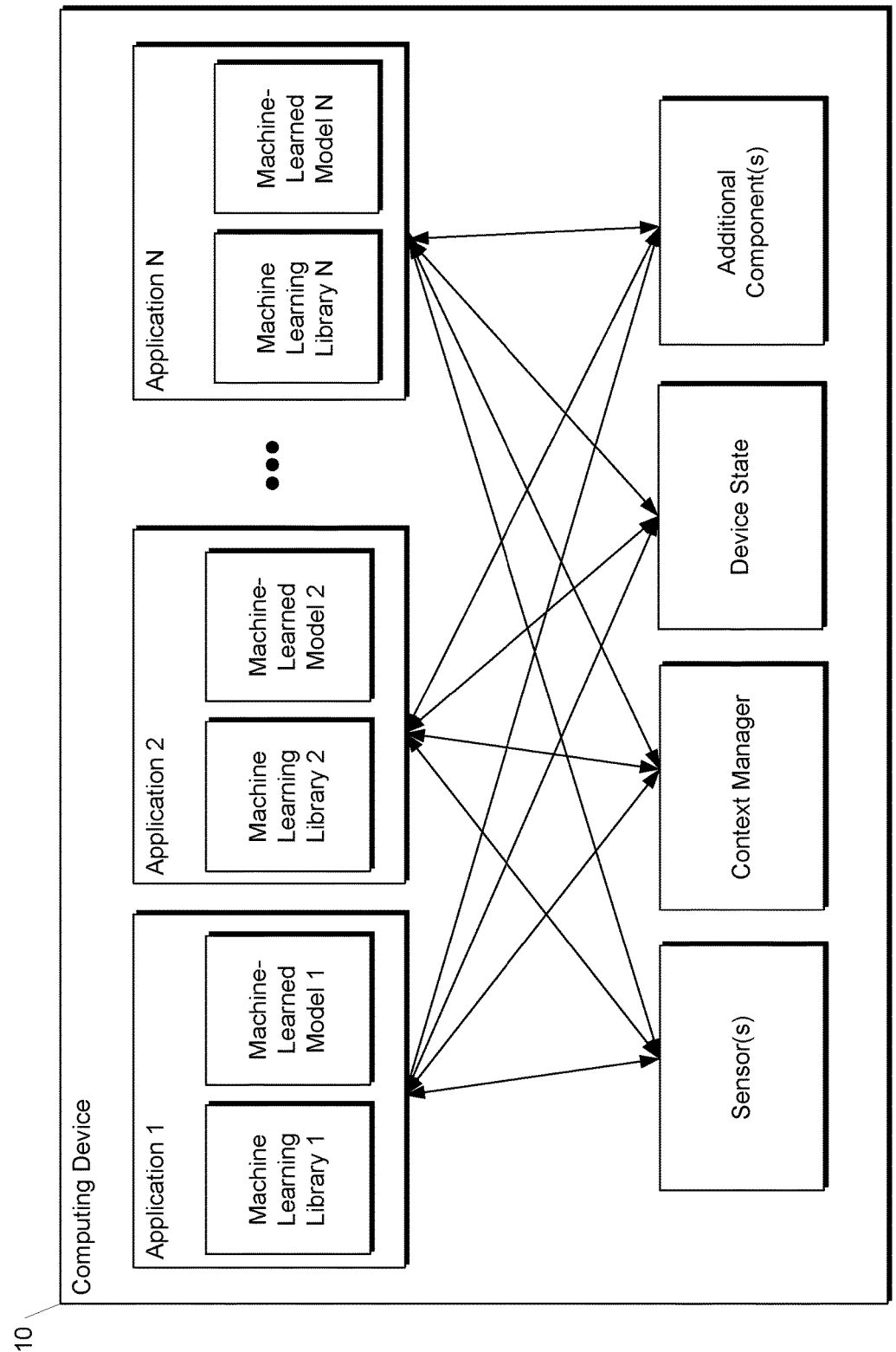
FIG. 1B depicts a block diagram of an example computing device according to example embodiments of the present disclosure.

FIG. 1B depicts a block diagram of an example computing device 10 that performs according to example embodiments of the present disclosure. The computing device 10 can be an entity computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
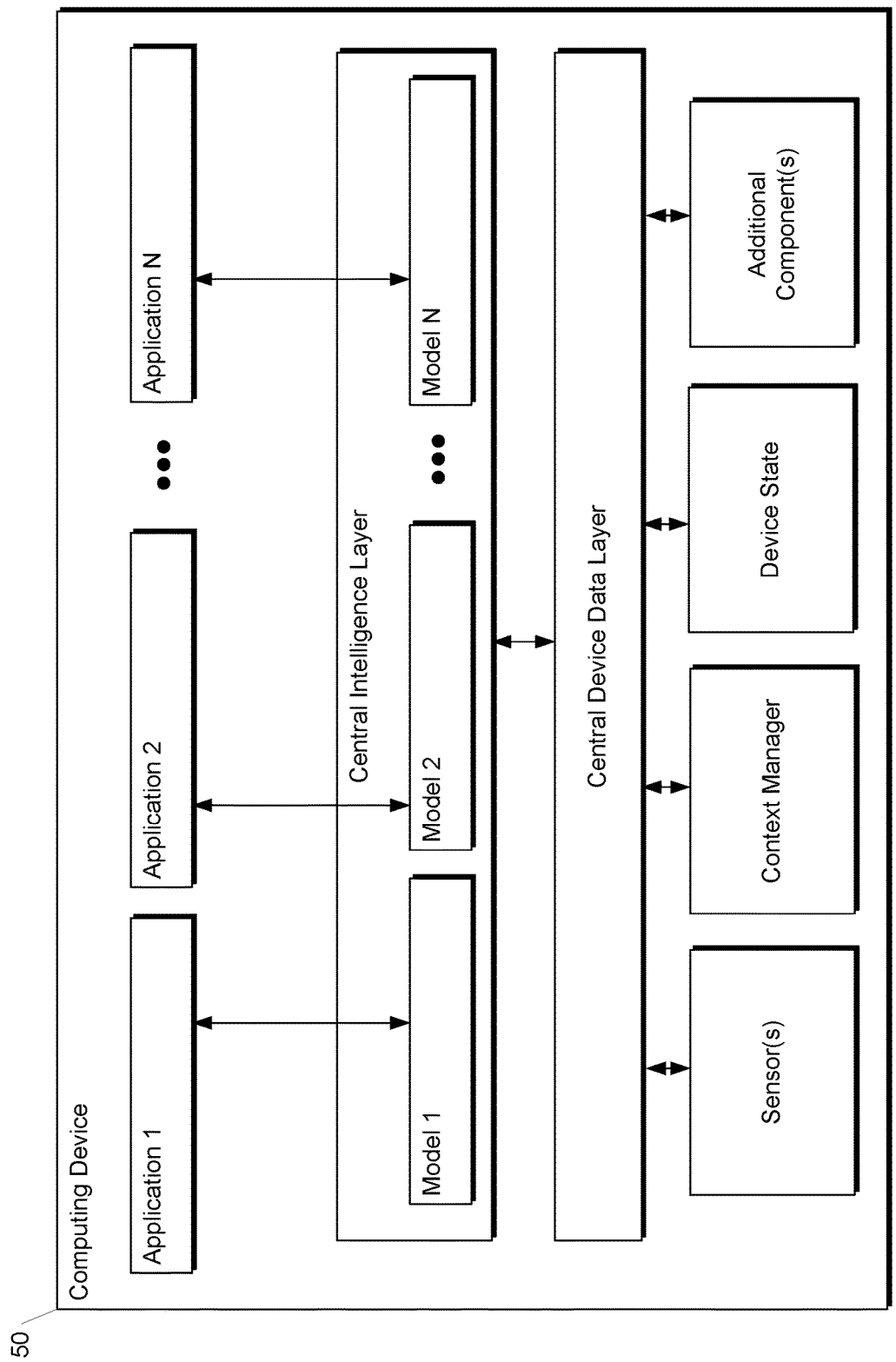
FIG. 1C depicts a block diagram of an example computing device according to example embodiments of the present disclosure.

FIG. 1C depicts a block diagram of an example computing device 50 that performs according to example embodiments of the present disclosure. The computing device 50 can be an entity computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
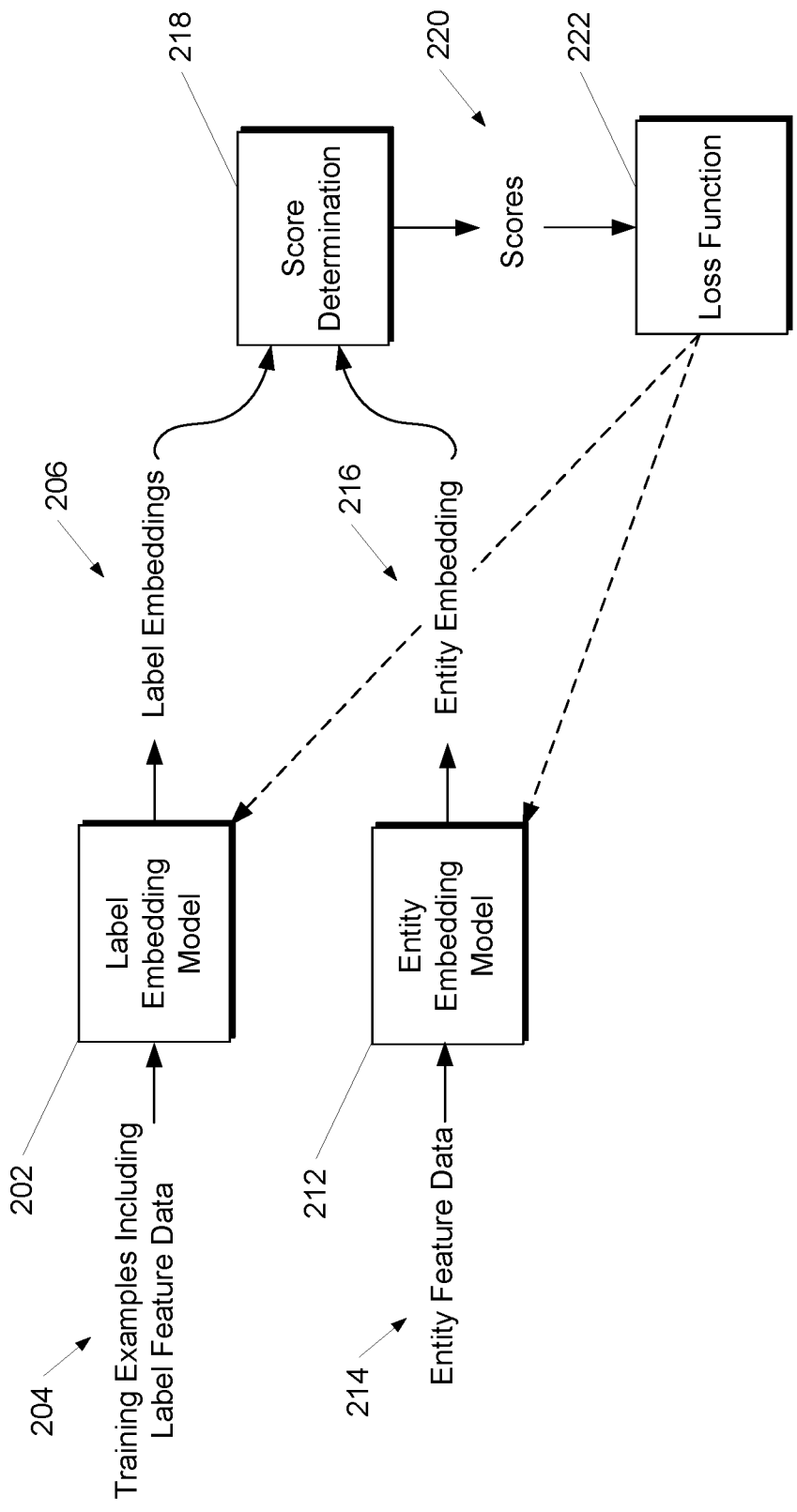
FIG. 2 depicts a block diagram of an example process to train an example label selection system according to example embodiments of the present disclosure.

FIG. 2 depicts a block diagram of an example process to train an example label selection system according to example embodiments of the present disclosure. As examples, different labels can correspond to potential actions that an entity can perform next and/or potential items that the entity would enjoy viewing, receiving, or otherwise interacting with next. Thus, in some examples, predicting an entity's next action based on the entity's past actions is a very integral problem for selecting items of content to recommend an entity. As one example, models trained to predict an entity's next visited video or song may be used to provide video or song recommendations while the entity is browsing a video or song sharing website. As another example, predictions of the entity's next query can be used to perform automatic completion of a search query or other query suggestions. As yet another example, predictions of a next website (e.g., which may be represented in the form of a uniform resource locator (URL)) can be used to power and/or improve features such selection of search results (e.g., for inclusion in a search results webpage), items of content (e.g., for inclusion in a feed such as a news feed or social feed), and/or many other similar problems/use cases.

Referring more specifically to FIG. 2, the illustrated label selection system includes a machine-learned entity embedding model 212 configured to receive and process entity feature data 214 descriptive of an entity to generate an entity embedding 216 for the entity. The label selection system includes a machine-learned label embedding model 202 configured to receive and process label feature data associated with one or more labels to generate a label embeddings 206 for the labels.

In particular, in the illustrated training scheme of FIG. 2, the label embedding model 202 receives training examples 204 that include label feature data. For example, the training examples 204 can include one or more positive label examples associated with the entity and one or more negative label examples unassociated with the entity. In some implementations, some or all of the negative label example(s) can be randomly selected (e.g., without regard to past interactions between the entity and the negative label example).

The label embeddings 206 and the entity embedding 216 can be used by a score determination system 218 to generate a set of scores 220 respectively for the training examples 204. As one example, the score 220 for each label can equal a dot product of the entity embedding 216 with the respective label embedding 206 for such label. In other examples different scoring functions can be used, including functions that generate scores based on measures of distance (e.g., L2 or Euclidian distance) between the entity embedding 216 with the respective label embedding 206 for each label.

A loss function 222 can evaluate the scores 220 to produce a loss value. As one example, the loss function can provide a loss value that is positively correlated with scores given to the negative training examples and negatively correlated with scores given to the positive training examples. In such fashion, minimization of the loss value can push/train the embedding models to produce respective embeddings that provide relatively large scores for the positive examples (e.g., past clicked URLs) and relatively smaller scores for the negative examples (e.g., unclicked URLs).

One or more parameters of one or both of the label embedding model 202 and the entity embedding model 212 can be modified based on the loss function 222 to train the models 202 and/or 212. For example, the loss function 222 can be backpropagated through one or both of the label embedding model 202 and the entity embedding model 212 and parameter(s) of the model(s) can be modified, for example, in a direction of a negative gradient of the loss function 222.

Figure 3:
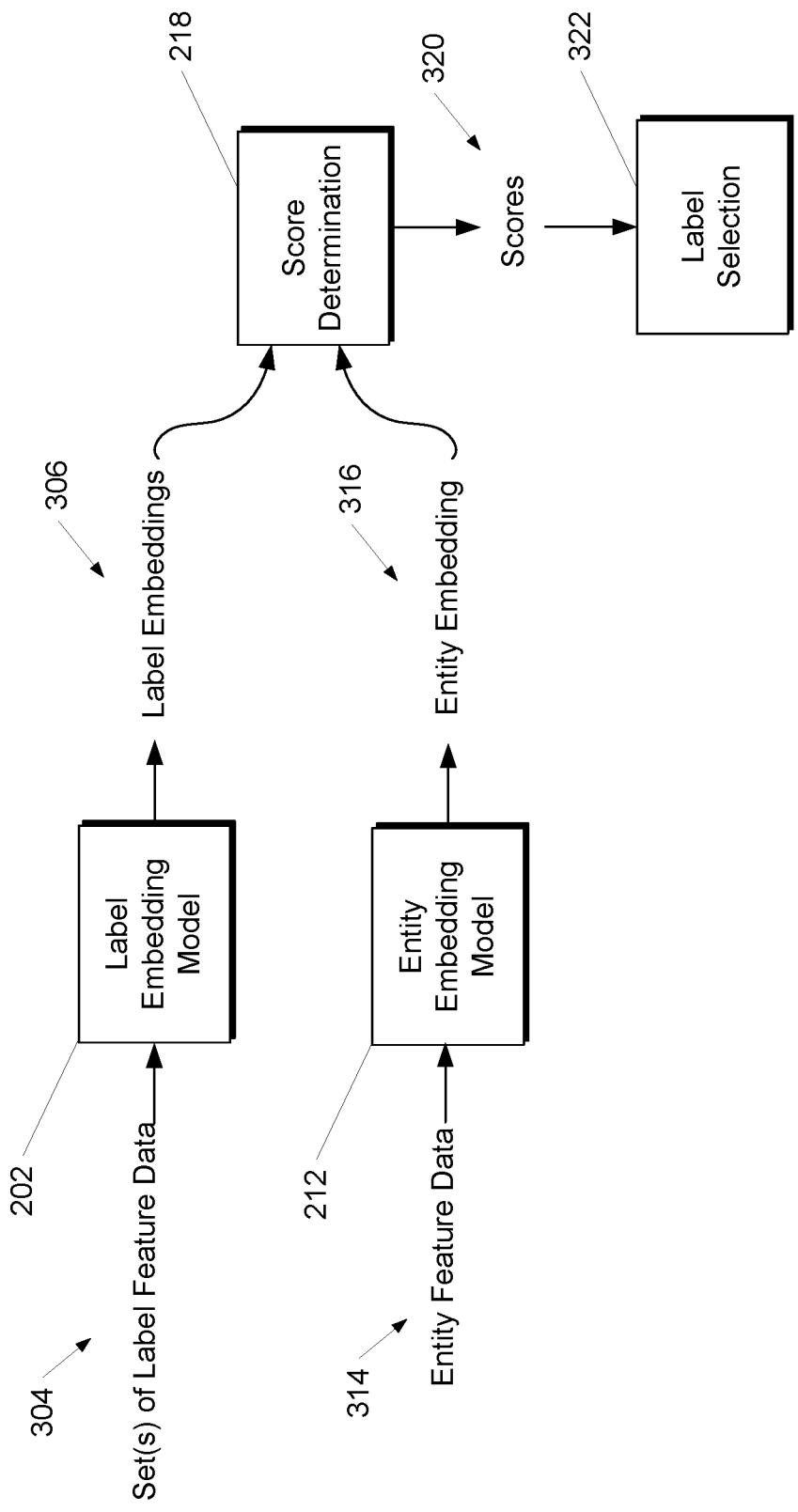
FIG. 3 depicts a block diagram of an example process to use an example label selection system according to example embodiments of the present disclosure.

FIG. 3 depicts a block diagram of an example process to use an example label selection system according to example embodiments of the present disclosure (e.g., following training as shown in FIG. 2). In particular, the system illustrated in FIG. 3 includes the machine-learned entity embedding model 212 which has been trained to receive and process entity feature data 314 descriptive of an entity to generate an entity embedding 316 for the entity. Further to the descriptions above, an entity may be provided with controls allowing the entity to make an election as to both if and when systems, programs, or features described herein may enable collection of entity information (e.g., information about an entity's social network, social actions, or activities, profession, an entity's preferences, or an entity's current location), and if the entity is sent content or communications from a server. In addition, certain data may be treated in one or more ways before it is stored or used, so that personally identifiable information is removed. For example, an entity's identity may be treated so that no personally identifiable information can be determined for the entity, or a entity's geographic location may be generalized where location information is obtained (such as to a city, ZIP code, or state level), so that a particular location of an entity cannot be determined. Thus, the entity may have control over what information is collected about the entity, how that information is used, and what information is provided to the entity.

The system also includes the machine-learned label embedding model 202 which has been trained to receive and process one or more sets of label feature data 304 associated with one or more labels to generate one or more label embeddings 306 for the one or more label.

The system can implement a score determination system 218 to determine one or more scores 320 for the one or more labels based at least in part on a comparison of the entity embedding 316 and one or more label embeddings 306. As one example, the score 320 for each label can equal a dot product of the entity embedding 316 with the respective label embedding 306 for such label. In other examples different scoring functions can be used, including functions that generate scores based on measures of distance (e.g., L2 or Euclidian distance) between the entity embedding 316 with the respective label embedding 306 for each label.

The system can implement a label selection system 322 to determine whether to select each label for the entity based at least in part on the score(s) 320 determined for label(s). For example, the scores 320 can be used to perform label selection 322 for selection of search results (e.g., for inclusion in a search results webpage), items of content (e.g., for inclusion in a feed such as a news feed or social feed), and/or many other similar problems/use cases.

According to an aspect of the present disclosure, the label embedding model 202 and/or the entity embedding model 212 can be run subsequent and in response to receiving a request associated with the entity. Thus, the embeddings 306 and/or 316 can be generated on the fly (e.g., during an active label selection process being performed for an entity).

Label selection 322 can be performed according to various different schemes such as: selecting the n highest scoring labels (e.g., top 3); selecting any label that received a score greater than a threshold; and/or other selection logic.

Example Methods

Figure 4:
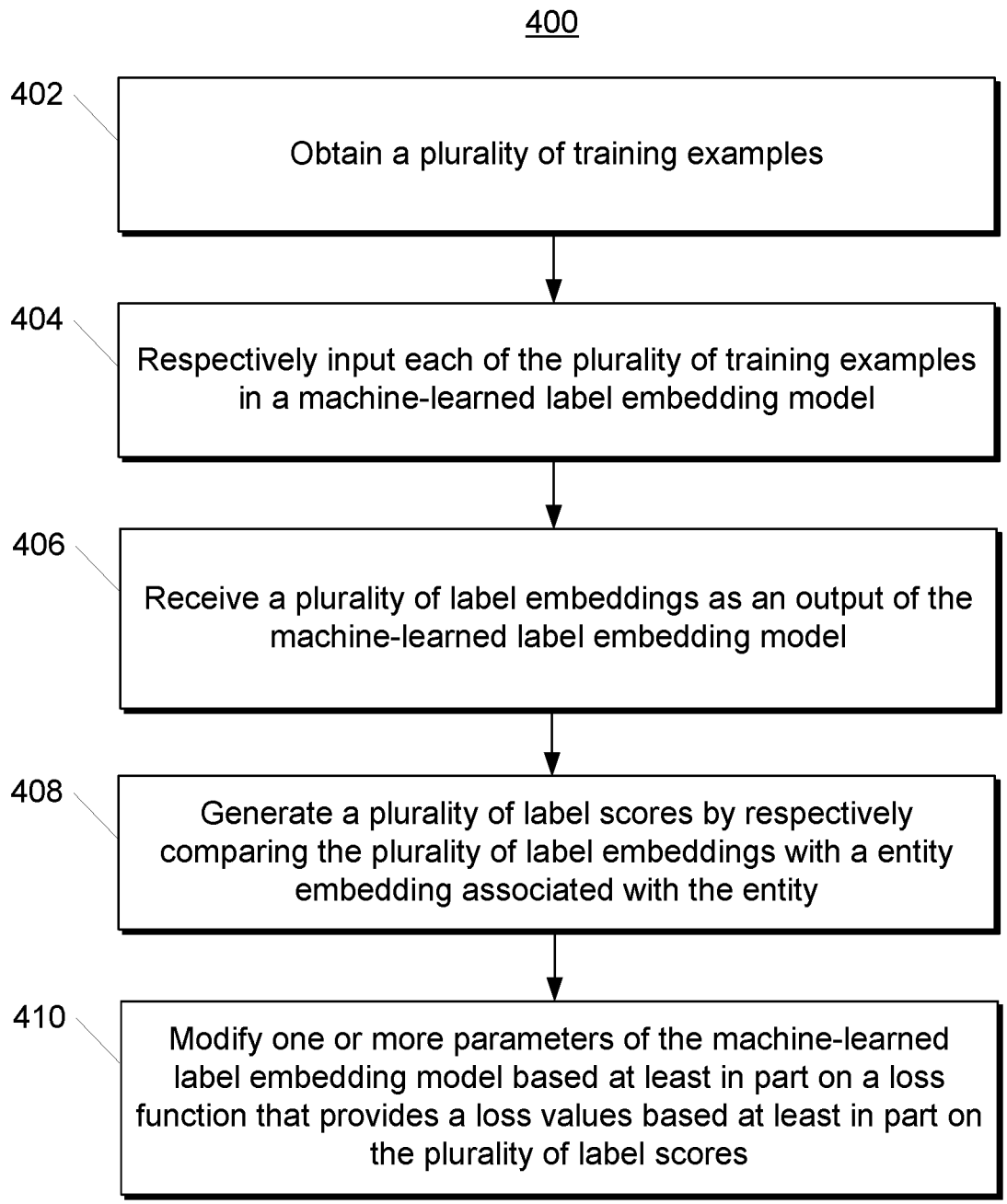
FIG. 4 depicts a flow chart diagram of an example method to train an example label selection system according to example embodiments of the present disclosure.

FIG. 4 depicts a flow chart diagram of an example method 400 to train a label selection system according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system obtains a plurality of training examples. The plurality of training examples can include a positive label example associated with an entity and a negative label example unassociated with the entity.

In some implementations, obtaining the plurality of training examples can include randomly selecting the negative label example without regard to past interactions between the entity and the negative label example.

In some implementations, obtaining the plurality of training examples can include querying a Sorted-String Table service to fetch a plurality of sets of label feature data respectively of the plurality of training examples; creating a training batch of training example pairs that each comprise a respective one of the plurality of sets of label feature data and a corresponding set of entity history data; and placing the training batch in a buffer.

At 404, the computing system respectively inputs each of the plurality of training examples into the machine-learned label embedding model that is configured to process the plurality of training examples to respectively generate a plurality of label embeddings.

At 406, the computing system receives the plurality of label embeddings as an output of the machine-learned label embedding model.

In some implementations, the method 400 can further include inputting entity feature data descriptive of an entity into a machine-learned entity embedding model configured to receive and process the entity feature data to generate an entity embedding for the entity and receiving the entity embedding as an output of the machine-learned entity embedding model.

At 408, the computing system generates a plurality of label scores by respectively comparing the plurality of label embeddings with an entity embedding associated with the entity, the plurality of label scores comprising a positive score for the positive label example and a negative score for the negative label example.

In some implementations, generating the plurality of label scores by respectively comparing the plurality of label embeddings with the entity embedding can include determining a respective dot product between each label embedding and the entity embedding.

At 410, the computing system modifies one or more parameters of the machine-learned label embedding model based at least in part on a loss function that provides a loss value based at least in part on the plurality of label scores. The loss value can be positively correlated with the negative score and negatively correlated with the positive score.

In some implementations, the method 400 can further include modifying one or more parameters of the machine-learned entity embedding model based at least in part on the loss function.

In some implementations, block 402 can be performed by or in a first thread while blocks 404-410 can be performed by or in a second thread.

Figure 5:
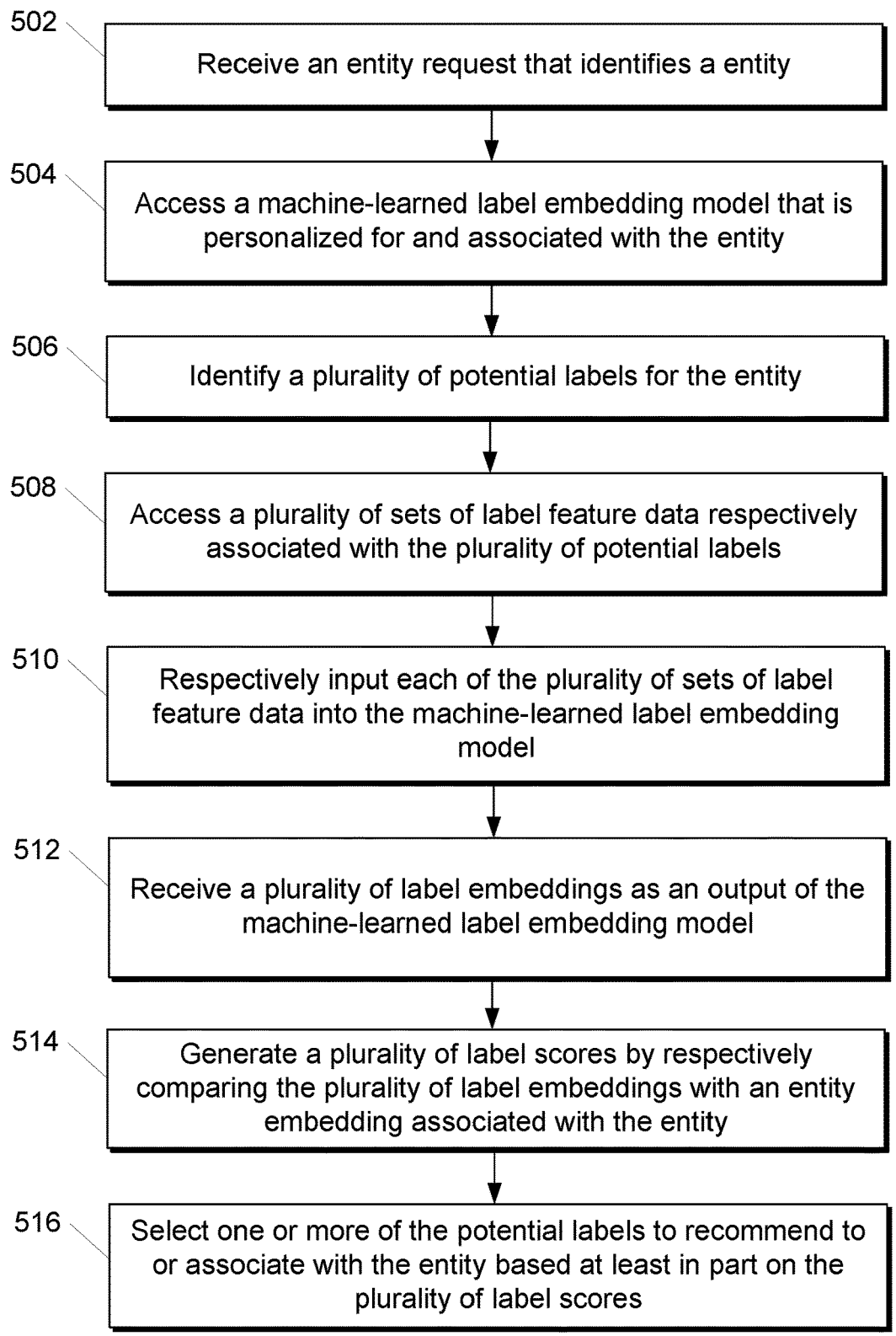
FIG. 5 depicts a flow chart diagram of an example method to use an example label selection system according to example embodiments of the present disclosure.

FIG. 5 depicts a flow chart diagram of an example method 500 to employ a label selection system according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system receives an entity request that identifies an entity. For example, the request can be a request by another, related computing system to select one or more labels for the entity.

At 504, the computing system accesses a machine-learned label embedding model that is personalized for and associated with the entity.

At 506, the computing system identifies a plurality of potential labels for the entity.

At 508, the computing system accesses a plurality of sets of label feature data respectively associated with the plurality of potential labels.

At 510, the computing system respectively inputs each of the plurality of sets of label feature data into the machine-learned label embedding model that is configured to process the sets of label feature data to respectively generate a plurality of label embeddings.

At 512, the computing system receives the plurality of label embeddings as an output of the machine-learned label embedding model.

At 514, the computing system generates a plurality of label scores by respectively comparing the plurality of label embeddings with an entity embedding associated with the entity.

At 516, the computing system selects one or more of the potential labels to recommend to the entity based at least in part on the plurality of label scores.

Additional Disclosure

This specification includes the subject matter of the following clauses:

1. A computer-implemented method of implementing a recommendation system on one or more computing devices, comprising: receiving a request that identifies an entity; accessing a machine-learned label embedding model that is associated with the entity, wherein the machine-learned label embedding model is stored in one or more memories of the one or more computing devices; identifying a plurality of potential labels for potential recommendation to the entity; accessing a plurality of sets of label feature data respectively associated with the plurality of potential labels; respectively inputting each of the plurality of sets of label feature data into the machine-learned label embedding model; processing the sets of label feature data at the machine-learned label embedding model to respectively generate a plurality of label embeddings; receiving the plurality of label embeddings as an output of the machine-learned label embedding model; generating a plurality of label scores by respectively comparing the plurality of label embeddings with an entity embedding associated with the entity; and selecting one or more of the potential labels to recommend to the entity based at least in part on the plurality of label scores.

2. The computer-implemented method of clause 1, wherein the one or more memories of the one or more computing devices store a Sorted-String Table that maps each of the plurality of potential labels to a respective set of label feature data, wherein the method comprises accessing the Sorted-String Table to obtain the plurality of sets of label feature data.

3. The computer-implemented method of clause 1 or clause 2, wherein the one or more computing devices comprise an entity device and wherein the one or more memories comprise one or more on-device memories of the entity device.

4. The computer-implemented method of any one of clauses 1 to 3, wherein processing the sets of label feature data at the machine-learned label embedding model comprises generating the plurality of label embeddings on the fly to enable the determination of whether to select a potential label for the entity in response to the request associated with the entity.

5. The computer-implemented method of any one of clauses 1 to 4, wherein generating the plurality of label scores by respectively comparing the plurality of label embeddings with an entity embedding associated with the entity comprises determining a dot product between the entity embedding and each respective label embedding.

6. The computer-implemented method of any one of clauses 1 to 5, wherein the selected label comprises a first item of content or a first autocompleted search query.

7. The computer-implemented method of any one of clauses 1 to 6, wherein the label feature data describes one or more past labels associated with the entity.

8. The computer-implemented method of any one of clauses 1 to 7, wherein at least the machine-learned label embedding model has been trained on one or more randomly sampled negative examples that correspond to labels that are unassociated with the entity.

9. A computer-implemented method to train a machine-learned label embedding model in a label selection system, the method comprising: obtaining, by one or more computing devices, a plurality of training examples, the plurality of training examples comprising a positive label example associated with an entity and a negative label example unassociated with the entity; respectively inputting, by the one or more computing devices, each of the plurality of training examples into the machine-learned label embedding model that is configured to process the plurality of training examples to respectively generate a plurality of label embeddings; receiving, by the one or more computing devices, the plurality of label embeddings as an output of the machine-learned label embedding model; generating, by the one or more computing devices, a plurality of label scores by respectively comparing the plurality of label embeddings with an entity embedding associated with the entity, the plurality of label scores comprising a positive score for the positive label example and a negative score for the negative label example; and modifying, by the one or more computing devices, one or more parameters of the machine-learned label embedding model based at least in part on a loss function that provides a loss value based at least in part on the plurality of label scores, wherein the loss value is positively correlated with the negative score and negatively correlated with the positive score.

10. The computer-implemented method of clause 9, further comprising: inputting, by the one or more computing devices, entity feature data descriptive of an entity into a machine-learned entity embedding model configured to receive and process the entity feature data to generate the entity embedding for the entity; receiving, by the one or more computing devices, the entity embedding as an output of the machine-learned entity embedding model; and modifying, by the one or more computing devices, one or more parameters of the machine-learned entity embedding model based at least in part on the loss function.

11. The computer-implemented method of clause 9 or clause 10, wherein obtaining, by one or more computing devices, the plurality of training examples comprises randomly selecting, by the one or more computing devices, the negative label example without regard to past interactions between the entity and the negative label example.

12. The computer-implemented method of any one of clauses 9 to 11, wherein generating, by the one or more computing devices, the plurality of label scores by respectively comparing the plurality of label embeddings with the entity embedding comprises determining, by the one or more computing devices, a respective dot product between each label embedding and the entity embedding.

13. The computer-implemented method of any one of clauses 9 to 12, wherein obtaining, by the one or more computing devices, the plurality of training examples comprises, by the one or more computing devices in a first thread: querying a Sorted-String Table service to fetch a plurality of sets of label feature data respectively of the plurality of training examples; creating a training batch of training example pairs that each comprise a respective one of the plurality of sets of label feature data and a corresponding set of entity history data; and placing the training batch in a buffer, wherein said respectively inputting, receiving, generating, and modifying are performed by the one or more computing devices in a second thread.

14. One or more non-transitory computer-readable media that collectively store instructions that, when executed by one or more computing devices, cause the one or more computing devices to perform the method of any one of clauses 1 to 13.

15. One or more computing devices configured to perform the method of any one of clauses 1 to 13.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system to select labels for an entity, the system comprising:
   one or more processors; and
   one or more non-transitory computer-readable media that collectively store:
   a machine-learned entity embedding model configured to receive and process entity feature data descriptive of an entity to generate an entity embedding for the entity;

a machine-learned label embedding model configured to receive and process first label feature data associated with a first label to generate a first label embedding for the first label; and instructions that, when executed by the one or more processors, cause the computing system to perform operations, the operations comprising:

determining a score for the first label based at least in part on a comparison of the entity embedding and the first label embedding; and determining whether to select the first label for the entity based at least in part on the score determined for the first label.

2. The computing system of claim 1, wherein the operations comprise:

subsequent and in response to receiving a request associated with the entity, running the machine-learned label embedding model to generate the first label embedding for the first label on the fly to enable the determination of whether to select the first label for the entity in response to the request associated with the entity.

3. The computing system of claim 1, wherein determining the score for the first label based at least in part on a comparison of the entity embedding and the first label embedding comprises determining a dot product between the entity embedding and the first label embedding.

4. The computing system of claim 1, wherein the first label comprises a first uniform resource locator (URL).

5. The computing system of claim 4, wherein determining whether to select the first label for the entity based at least in part on the score determined for the first label comprises determining, based at least in part on the score determined for the first label, whether to include the first URL in a set of search results provided to the entity.

6. The computing system of claim 4, wherein the first label feature data describes one or more words included in the first URL, a title of the first URL, or one or more salient terms included in a webpage accessible at the first URL.

7. The computing system of claim 1, wherein the first label comprises a first item of content or a first autocompleted search query.

8. The computing system of claim 1, wherein the entity feature data describes one or more past labels associated with the entity.

9. The computing system of claim 1, wherein:

the one or more non-transitory computer-readable media collectively store a Sorted-String Table that maps each of a plurality of potential labels to a plurality of sets of label feature data, the plurality of potential labels including the first label; and the operations further comprise:

accessing the Sorted-String Table to obtain the first label feature data; and providing the first label feature data to the machine-learned label embedding model.

10. The computing system of claim 1, wherein at least the machine-learned label embedding model has been trained on one or more randomly sampled negative examples that correspond to labels that are unassociated with the entity.

11. The computing system of claim 1, wherein the machine-learned label embedding model comprises a personalized machine-learned label embedding model that has been trained on personal training data that is specific to the entity.

12. A computer-implemented method to train a machine-learned label embedding model in a label selection system, the method comprising:

obtaining, by one or more computing devices, a plurality of training examples, the plurality of training examples comprising a positive label example associated with an entity and a negative label example unassociated with the entity;

respectively inputting, by the one or more computing devices, each of the plurality of training examples into the machine-learned label embedding model that is configured to process the plurality of training examples to respectively generate a plurality of label embeddings;

receiving, by the one or more computing devices, the plurality of label embeddings as an output of the machine-learned label embedding model;

generating, by the one or more computing devices, a plurality of label scores by respectively comparing the plurality of label embeddings with an entity embedding associated with the entity, the plurality of label scores comprising a positive score for the positive label example and a negative score for the negative label example; and modifying, by the one or more computing devices, one or more parameters of the machine-learned label embedding model based at least in part on a loss function that provides a loss value based at least in part on the plurality of label scores, wherein the loss value is positively correlated with the negative score and negatively correlated with the positive score.

13. The computer-implemented method of claim 12, further comprising:

inputting, by the one or more computing devices, entity feature data descriptive of an entity into a machine-learned entity embedding model configured to receive and process the entity feature data to generate the entity embedding for the entity;

receiving, by the one or more computing devices, the entity embedding as an output of the machine-learned entity embedding model; and modifying, by the one or more computing devices, one or more parameters of the machine-learned entity embedding model based at least in part on the loss function.

14. The computer-implemented method of claim 12, wherein obtaining, by one or more computing devices, the plurality of training examples comprises randomly selecting, by the one or more computing devices, the negative label example without regard to past interactions between the entity and the negative label example.

15. The computer-implemented method of claim 12, wherein generating, by the one or more computing devices, the plurality of label scores by respectively comparing the plurality of label embeddings with the entity embedding comprises determining, by the one or more computing devices, a respective dot product between each label embedding and the entity embedding.

16. The computer-implemented method of claim 12, wherein obtaining, by the one or more computing devices, the plurality of training examples comprises:

by the one or more computing devices in a first thread:

querying a Sorted-String Table service to fetch a plurality of sets of label feature data respectively of the plurality of training examples;

creating a training batch of training example pairs that each comprise a respective one of the plurality of sets of label feature data and a corresponding set of entity history data; and placing the training batch in a buffer;

wherein said respectively inputting, receiving, generating, and modifying are performed by the one or more computing devices in a second thread.

17. The computer-implemented method of claim 12, wherein the plurality of training examples comprises a plurality of uniform resource locator (URL) examples.

18. The computer-implemented method of claim 17, wherein each training example comprises URL feature data that describes one or more words included in the corresponding URL example, a title of the corresponding URL example, or one or more salient terms included in a webpage located at the corresponding URL example.

19. The computer-implemented method of claim 12, wherein the plurality of training examples comprise a plurality of personal training examples that are specific to the entity.

20. One or more non-transitory computer-readable media that collectively store instructions that, when executed by one or more computing devices, cause the one or more computing devices to perform operations, the operations comprising;

receiving an entity request that identifies an entity;

accessing a machine-learned label embedding model that is personalized for and associated with the entity;

identifying a plurality of potential labels for the entity;

accessing a plurality of sets of label feature data respectively associated with the plurality of potential labels;

respectively inputting each of the plurality of sets of label feature data into the machine-learned label embedding model that is configured to process the sets of label feature data to respectively generate a plurality of label embeddings;

receiving the plurality of label embeddings as an output of the machine-learned label embedding model;

generating a plurality of label scores by respectively comparing the plurality of label embeddings with an entity embedding associated with the entity; and selecting one or more of the potential labels to recommend to the entity based at least in part on the plurality of label scores.

* * * * *